Aug. 24, 1948.   G. R. FONDA   2,447,851
LUMINESCENT SCREEN INDICATING
CHANGES IN IMAGE FORMATION
Filed July 24, 1944

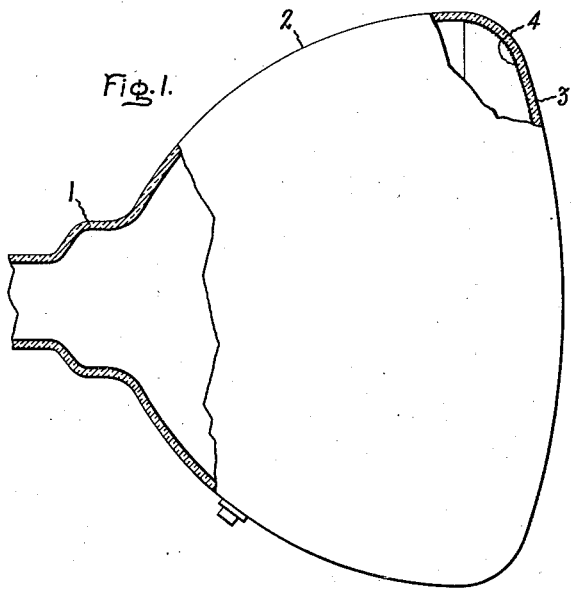

Fig.1.

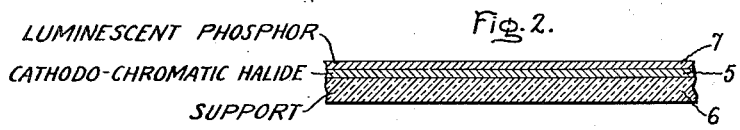

Fig.2.

LUMINESCENT PHOSPHOR
CATHODO-CHROMATIC HALIDE
SUPPORT

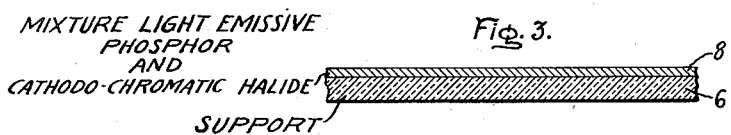

Fig.3.

MIXTURE LIGHT EMISSIVE
PHOSPHOR
AND
CATHODO-CHROMATIC HALIDE
SUPPORT

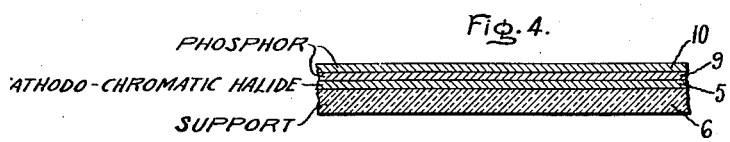

Fig.4.

PHOSPHOR
CATHODO-CHROMATIC HALIDE
SUPPORT

PHOSPHORS 9 AND 10 HAVE UNLIKE EMISSITIES,
THEIR LIGHT OUTPUT IS RESPECTIVELY
TRANSMITTED AND ABSORBED BY HALIDE 5.

Inventor:
Gorton R. Fonda,
by Harry E. Dunham
His Attorney.

Patented Aug. 24, 1948

2,447,851

UNITED STATES PATENT OFFICE 2,447,851

LUMINESCENT SCREEN INDICATING CHANGES IN IMAGE FORMATION

Gorton R. Fonda, Schenectady, N. Y., assignor to General Electric Company, a corporation of New York Application July 24, 1944, Serial No. 546,338

8 Claims. (Cl. 250—164)

The present invention relates to cathode ray screens. It is the object of my invention to provide screens which are selectively affected when cathode ray bombardment thereof is continued for periods of materially different lengths. My invention makes it possible to discriminate in radio-pulse echo apparatus between stationary and moving objects.

In range-finding and direction-finding equipments, such as may be employed to detect the presence of distant objects, electromagnetic waves are radiated and some of these radiations are reflected by both moving or stationary objects. Images are formed in response to the reflected rays on the screen of a cathode ray tube forming part of such equipment. It is desirable to distinguish between images caused by moving objects and images caused by stationary objects. It is desirable also that images or traces indicating moving objects, for example approaching aircraft, should show on the screen the direction of motion of such objects.

In accordance with my present invention improved cathode ray screens are provided on which luminescent images or dark traces are selectively formed so that their color is dependent upon the length of period of excitation. Such improved screens comprise combinations including both a phosphor, which in response to electron impact will produce luminescent light, and a cathodo-chromatic substance, such as an alkali halide, which in response to electron impact will develop a discoloration strong enough to absorb light of appropriate wave length. The term cathodo-chromatic material, or more briefly chromatic material, is used herein to designate material which is capable of forming dark colorations when subjected to the impact of electrons.

In the accompanying drawing, Fig. 1 shows somewhat conventionally in section and in part broken away a cathode ray tube as representative of a device to which my invention is applicable, and Figs. 2, 3 and 4 are conventional views showing on a magnified scale forms which screens embodying my invention may assume.

When the screen components are chosen from these two classes to match the luminescent emission of the phosphor and the absorption band of the discoloration or dark-trace developed in the cathodo-chromatic substance, then either luminescent markings or dark traces will preponderate, depending on the persistence of the excitation, thus enabling the observer to distinguish motion as above-indicated. For example, in a device embodying my present invention a fresh signal, such as reflected waves from a movable object, will be characterized by a luminous screen marking which has its maximum luminosity in the latest position of the moving object. On the other hand, a sufficient number of repeated signals received upon an identical spot of the screen, such as from a stationary object, will be characterized by a dark-trace on the screen. The luminous trace formed simultaneously in the phosphor is absorbed by this dark trace so that the observer perceives only the dark trace, which thus indicates a stationary object.

In practice, the outer face of the screen is illuminated at an intensity sufficient to make the dark trace on the screen visible and also to bring about its slow decay. This illumination, however, must be at a lower intensity than the brightness of luminescence emitted by the phosphor component of the screen under the impact of a fresh signal in order that the resulting luminosity of the signal trace may be perceived by the observer. Whenever desired, the illumination may be increased temporarily to a very high value in order to bring about the rapid decay of all old dark traces, thereby "wiping the slate clean" and making it available for a new series of observations.

As cathode ray devices are well known, the cathode and other electrode parts have been omitted in Fig. 1 in order to simplify the drawing.

A cathode ray device may comprise an elongated sealed envelope of unequal diameter. It commonly consists of glass. One end of the envelope 1, which in general is a relatively narrow and tubular part (not shown), contains an electron gun. The bulbous part 2, which is illustrated, has an approximately flat end wall 3 known as a window. Upon the inner surface of the window 3 a screen 4 is applied. The cathode rays or electrons which are projected upon the screen from the electron gun form light or dark patterns or traces on the screen.

A screen embodying my present invention may consist of two layers or strata, as shown greatly magnified in Fig. 2. As here illustrated, the cathodo-chromatic layer 5 is applied directly upon the glass 6. The phosphor layer 7 is applied over the layer 5. This arrangement is suitable for the usual case in which the outer face of the tube is illuminated and observed. In case it should be desired to view the inner face of the screen, the order should be reversed. The screen may also be made in a single layer 8, as shown in Fig. 3, in which the chromatic material and the phosphor are mixed in appropriate proportions.

Ordinarily the chromatic material consists of an alkali halide. A thin layer of halide, for example potassium chloride, first is deposited on the end wall or window of the glass cathode ray tube. Upon this layer of halide is deposited a thin stratum or film of phosphor, for example zinc-cadmium sulfide, activated with copper. The thickness of the superimposed layer must be so limited that an appreciable proportion of electrons may be transmitted for excitation of the halide layer. I have found that desirable results can be obtained from such a screen when the layer of potassium chloride contains about 3 mgs./cm.$^2$ and the superimposed layer of zinc cadmium sulfide contains about 0.3 mgs./cm.$^2$.

Areas of the phosphor layer 7, when subjected to the impact of electrons of the cathode ray beam, are thereby caused to become luminescent. Areas thus energized glow with a yellow luminosity when the energizing ray impact is of short duration and directed upon a fresh spot of the screen. Should the impulse be protracted, the underlying halide layer 5 becomes energized. It forms darkened areas or traces, magenta in color, capable of absorbing light at the regions energized. Thus a stationary or slow-moving object, when reflecting radiations with a degree of continuity, is translated by the apparatus into a correspondingly protracted cathode ray impulse so that the luminosity from the phosphor becomes absorbed by the dark trace that is simultaneously formed in the chromatic layer.

It is important that the absorption band of the dark trace formed in the halide and the luminescent emission of the phosphor should have approximately the same spectral distribution. Keeping this requirement in view, good results can be obtained with various other combinations of chromatic materials and phosphors.

The composition of the zinc-cadmium sulfide may be varied to give different luminescent colors, thus making possible the selection of one whose emission spectrum will coincide with the absorption spectrum of the dark trace for whatever chromatic substance is chosen.

The following table indicates some of the possible variations. The phosphors in each case are zinc-cadmium sulfide of variable cadmium content, such phosphors being activated with copper. The chromatic substance is one of the halides mentioned which are notable for the intensity of dark trace formed. Rubidium chloride, potassium bromide, or other halides may be employed, for example, when a faster decay of dark trace is desired than that characteristic of potassium chloride.

Screen composition

| CdS Content of Zn-Cd Sulfide | Halide | Peak Emission Phosphor | Peak Absorption Halide | Color | |
|---|---|---|---|---|---|
| | | | | Luminescence of Phosphor | Dark Trace of Halide |
| | | Å. | Å. | | |
| 12% | KCl | 5650 | 5360 | yellow | magenta. |
| 20% | RbCl | 6050 | 6090 | yellow-orange. | green. |
| 30% | KBr | 6350 | 6300 | orange | blue. |

In place of the zinc-cadmium sulfides (copper-activated) listed in the table, other phosphors which are excited to luminosity by electrons may be used, as for example zinc-beryllium silicate (manganese-activated). It should contain such proportions of beryllium and of manganese that its emission corresponds in wave length with the absorption of the dark trace formed in the chromatic substance employed.

The chosen light-emissive and light-absorbing materials may be mixed with one another and applied as a single film, as indicated in Fig. 3, or may be applied as separate layers.

If is is desired that both fresh and repeated signals be observed as luminescent traces, two phosphors may be employed as shown in Fig. 4. Their luminescence should be of different colors. One of them should be chosen so that its emissive light is absorbed by the dark trace formed in the cathodo-chromatic material. Two such phosphor layers 9 and 10 are shown in Fig. 4 in exaggerated thickness. They overlie a halide layer 5 on the glass wall 6.

The purpose of the second luminescent phosphor is to emit light of a color contrasting with the light emitted by the first luminescent phosphor. The emission band of the second phosphor should be outside the absorption band of the dark trace. For this reason its luminescence is transmitted through the window of the cathode ray tube to the observer even in the presence of a dark trace. In such a case a repeated signal forms a dark trace in the halide which will absorb the luminescence of the first phosphor whose emission has the same color as the absorption band of the dark trace. Consequently a repeated signal will be denoted by a trace having the color of the second phosphor alone. In contrast, the color of a fresh trace will be that made by the combination of luminescence from both phosphors.

Such a screen could be used in those cases where it was desired to make observations completely in the dark. Briefly and periodically the face of the tube may be subjected to strong illumination (from a source not shown) to clear away all dark traces present and render it suitable for a new series of tests. Suitable phosphors for such a screen will include one of those mentioned in the table above. The phosphor may be used in conjunction with the corresponding halide mentioned. The second phosphor may be zinc sulfide (copper-activated) which luminesces green. The most appropriate mixture would be this green-luminescing zinc sulfide associated with zinc-cadmium sulfide containing about 30 per cent CdS (copper-activated), luminescing red. These phosphors may be used in conjunction with a chromatic screen material comprising potassium bromide. The order of superposition of the halide and phosphor layers may be varied in accordance with the conditions of used and results desired.

What I claim as new and desire to secure by Letters Patent of the United States is:

1. A cathode ray tube comprising the combination of a glass envelope having a window, means for projecting cathode rays on said window, a film coating the ray-receiving surface of said screen, said film consisting of a mixture of a fluorescent sulfide and a cathodo-chromatic alkali halide.

2. A luminescent screen adapted to be excited by electron beam impact comprising a transparent foundation of glass, a coating thereon comprising potassium bromide and an overlying coating of zinc-cadmium sulfide having an emission spectrum in the same wave length range as the absorption spectrum of said bromide and of such thickness that an appreciable proportion of electrons impinging on said sulfide are transmitted to said underlying halide layer, whereby said screen is rendered selectively responsive to electron bombardment of unlike duration.

3. A cathode ray screen which is selectively responsive to excitation by electron bombardment for time periods of different duration consisting of a support of transparent material and a plurality of components on said support each responsive to electrons impinging upon said screen, said components comprising a first component of cathodo-chromatic material having a color absorption band when subjected to prolonged electron bombardment, a second component consisting of a phosphor having an emission band of luminescence substantially coinciding with the absorption band of said cathodo-chromatic material when excited by electron bombardment of short duration, and a third component consisting of a phosphor having an emission band of luminescence substantially outside of the absorption band of said cathodo-chromatic material when excited by electron bombardment of short duration.

4. A screen as in claim 3 wherein said second component comprises reddish luminescent copper-activated zinc-cadmium sulfide containing about 30% cadmium sulfide and said third component comprises a greenish luminescent copper-activated zinc sulfide.

5. A screen as in claim 4 wherein said first component comprises potassium bromide.

6. A cathode ray screen which is selectively responsive to excitation by electron bombardment for time periods of different duration consisting of a support of transparent material and a plurality of layers on said support each responsive to electrons impinging upon said screen, said layers comprising a first layer of cathodo-chromatic material affixed to said support and having a color absorption band when subjected to prolonged electron bombardment, a second layer superimposed on said first layer and consisting of a phosphor having an emission band of luminescence substantially coinciding with the absorption band of said cathodo-chromatic material when excited by electron bombardment of short duration, and a third layer superimposed on said second layer and consisting of a phosphor having an emission band of luminescence substantially outside of the absorption band of said cathodo-chromatic material when excited by electron bombardment of short duration.

7. A screen as in claim 6 wherein said second layer comprises reddish luminescent copper-activated zinc-cadmium sulfide containing about 30% cadmium sulfide and said third layer comprises a greenish luminescent copper-activated zinc sulfide.

8. A screen as in claim 7 wherein said first layer comprises potassium bromide.

GORTON R. FONDA.

REFERENCES CITED

The following references are of record in the file of this patent:

UNITED STATES PATENTS

| Number | Name | Date |
| --- | --- | --- |
| 2,303,563 | Law | Dec. 1, 1942 |
| 2,330,171 | Rosenthal | Sept. 21, 1943 |
| 2,330,172 | Rosenthal | Sept. 21, 1943 |
| 2,418,779 | Leverenz | Apr. 8, 1947 |
| 2,418,780 | Leverenz | Apr. 8, 1947 |